United States Patent [19]
Yamamoto et al.

[11] Patent Number: 5,637,272
[45] Date of Patent: Jun. 10, 1997

[54] METHOD OF MANUFACTURING A MULTI-HOLED SURFACE PLATE MADE OF A COMPOSITE MATERIAL AND A RAW FORMING ELEMENT OF THE COMPOSITE MATERIAL THEREFOR

[75] Inventors: Tetsuya Yamamoto; Shigeru Nishiyama; Kouichi Saito, all of Nagoya, Japan

[73] Assignee: Mitsubishi Jukogyo Kabushiki Kaisha, Tokyo, Japan

[21] Appl. No.: 459,759

[22] Filed: Jun. 2, 1995

[30] Foreign Application Priority Data

Jun. 22, 1994 [JP] Japan .................. 6-140227

[51] Int. Cl.⁶ .......................... B29C 33/40; B29C 67/00; B29C 45/00; B28B 1/48
[52] U.S. Cl. .......................... 264/225; 264/510; 264/156; 264/316; 264/324
[58] Field of Search .......................... 264/510, 156, 264/258, 267, 271.1, 273, 220, 225, 226, 316, 347, 324

[56] References Cited

U.S. PATENT DOCUMENTS

| | | | |
|---|---|---|---|
| 2,186,881 | 1/1940 | Parsons | 264/316 |
| 2,837,455 | 6/1958 | Wolf | 264/273 |
| 2,934,790 | 5/1960 | Shwayder | 264/156 |
| 3,832,264 | 8/1974 | Barnette | 264/273 |
| 4,257,998 | 3/1981 | Diepenbrock, Jr. et al. | 264/156 |
| 4,312,829 | 1/1982 | Fourcher | 264/510 |
| 4,568,597 | 2/1986 | Williams | 428/137 |
| 4,776,907 | 10/1988 | Massions et al. | 264/510 |
| 4,942,012 | 7/1990 | Lee et al. | 264/510 |
| 5,261,993 | 11/1993 | Dahlgren | 156/382 |
| 5,500,164 | 3/1996 | Livesay et al. | 264/510 |

FOREIGN PATENT DOCUMENTS

| | | |
|---|---|---|
| 0 471 459 A1 | 7/1991 | European Pat. Off. |
| 2.097.151 | 3/1972 | France . |
| 47-2131 | 2/1972 | Japan . |
| 2 090 183 | 7/1982 | United Kingdom . |
| 93/22128 | 11/1993 | WIPO . |

OTHER PUBLICATIONS

Hersen, et al., "SAE International, SAE Technical Paper Series, Carbon Epoxy Perforated Skin for Nacelle Acoustic Tratment", Oct., 1990, pp. 1–9.

Primary Examiner—Jan H. Silbaugh
Assistant Examiner—Robin S. Gray
Attorney, Agent, or Firm—Wenderoth, Lind & Ponack

[57] ABSTRACT

A method of manufacturing a multi-holed plate made of a composite material wherein a molding resin is filled, with a resin membrane being applied inbetween, in the previously prepared holes of a raw forming element of the composite material and the raw forming element of the composite material is hardened by heat and pressure.

4 Claims, 2 Drawing Sheets

METHOD OF MANUFACTURING A MULTI-HOLED SURFACE PLATE MADE OF A COMPOSITE MATERIAL AND A RAW FORMING ELEMENT OF THE COMPOSITE MATERIAL THEREFOR

BACKGROUND OF THE INVENTION

1. Field of the Invention

The present invention relates to a method of manufacturing a multi-holed surface plate made of a composite material applied to aircraft engine nacelles, etc. where a lighter weight is required and to a raw element of the composite material to be formed thereby.

2. Description of the Prior Art

In manufacturing a multi-holed surface plate of a composite material, some measure is necessary to provide through-holes on the surface of the plate. A known method of making holes by use of drills or mechanical punches, after a raw forming element of a composite material (hereinafter referred to as "prepreg") is hardened and formed as a product, needs a relatively long working time, is expensive, and is difficult to work.

As a measure to solve this problem, the specification of the Japanese laid-open patent application No. Sho 47(1972)-2131 discloses method of manufacturing a multi-holed reinforced plastic element including a process for hardening plastics contained in a sheet wherein a forming jig, having a back side surface and an open side surface and having a plurality of studs jutted and arranged with a space between each other on the open side surface, each stud being sharpened on its point, is provided and a partially hardened sheet impregnated by reinforced plastics is put on the studs and is so pressed as to be pierced by the studs and then the plastics contained in the sheet is hardened while the sheet is pressed. But in this method also, it is necessary to prepare a special forming jig for each form of product, thus this method was found not necessarily advantageous from the view point of cost of work.

SUMMARY OF THE INVENTION

In view of the present level of the art for manufacturing the multi-holed surface plate of a composite material, it is therefore an object of the present invention to provide an improved method by which disadvantages in reducing manufacturing costs, such as making holes with the work time and expenses after forming the composite material surface plate or preparing special forming jigs reduced even in the case of manufacturing a multi-holed surface plate by making holes simultaneously with forming of a surface plate of a composite material.

The present invention relates to a method of manufacturing a multi-holed surface plate made of a composite material by use of a prepreg having previously prepared holes, wherein a molding resin is filled, with a resin membrane being applied inbetween, in the previously prepared holes of a raw forming element of the composite material consisting of reinforcing fibers and matrix resins and the raw forming element of the composite material is hardened by heat and pressure. Further, the present invention relates to a raw element of a composite material to be formed, wherein the holes thereof are made by mechanical punches.

The prepreg previously holed by mechanical punches, etc. pursuant to the present invention consists of a reinforcing cloth woven by glass fibers or carbon fibers, etc. and of matrix resins like epoxy resins, etc. The holes of the prepreg are previously filled, or filled and hardened, with molding resins like a half-hardened silicone rubber sheet or a natural temperature hardening type silicone resin, with a resin membrane being applied inbetween, whereby the matrix resin in the prepreg, if melted, is prevented from flowing into the holes; hence blocking them. The prepreg so prepared is heated and hardened for forming and completed as a multi-holed surface plate, with the holes being kept as they are, after the molding resin and the resin membrane is removed.

Further, in the present invention, in order to fill the molding resin in the holes of the raw forming element of the composite material, the molding resin is covered by a breather made of a woven stuff, whereby a vacuum exhaustion for filling the molding resin into the holes of the raw forming element of the composite material can be carried out.

The molding resins used for practice of the present invention can be selected, in addition to the silicone resin as mentioned above, from such thermosetting resins as epoxy resins, polyester resins, etc. or such thermosetting resins as polyethylene resins, nylon resins, vinyl resins, etc. Further, as for the resin membrane, such membrane made of silicone resins, polyfluoroethylenes or polyethylenes can be used. The materials of these molding resins and resin membranes are selected according to the temperature of heating and hardening.

DESCRIPTION OF THE PREFERRED EMBODIMENTS

Now the preferred embodiments of the present invention will be described with reference to the accompanying drawings.

Figure 1:
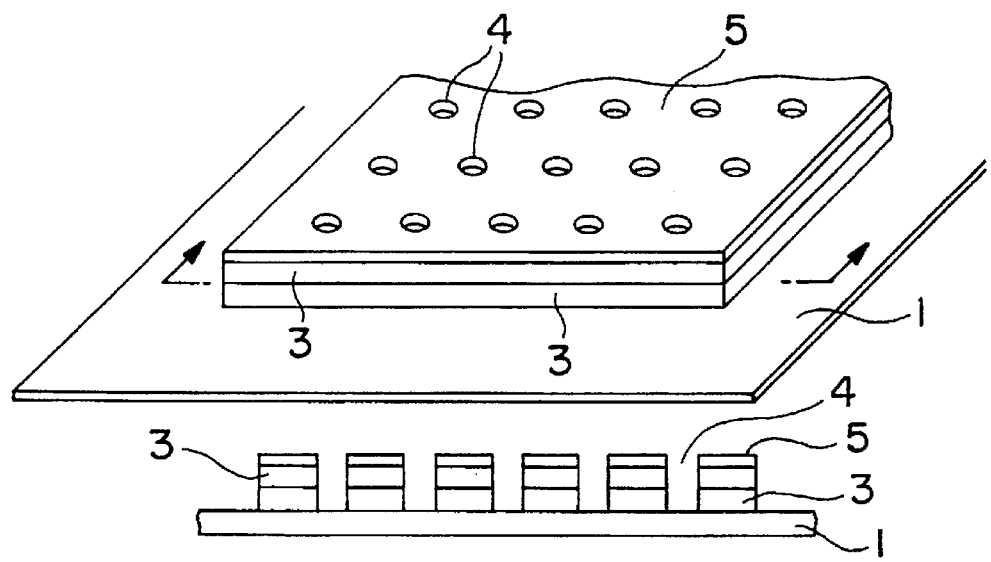
FIG. 1 is an illustrative drawing showing holes of a prepreg according to a preferred embodiment of the present invention.

As shown in FIG. 1, a prepreg 3, which is a woven stuff, is used as reinforcing fibers (reinforcing fibers: glass fibers, carbon fibers, silica fibers, alumina fibers, etc. and a matrix resin selected from epoxy resins, bismaleimide resins, polyester resins, phenol resins, polyimide resins, etc.) and is laid in two layers. A plastic film 5 made of a fluororesin, which is good in mold releasability, is applied to both of its surfaces for the purpose of preventing dust from sticking at the time of mechanical punching. The prepreg is then holed by mechanical punching and set on a forming jig 1. In this FIG. 1, the plastic film applied on the side of the forming jig 1 has been already taken off.

Figure 2:
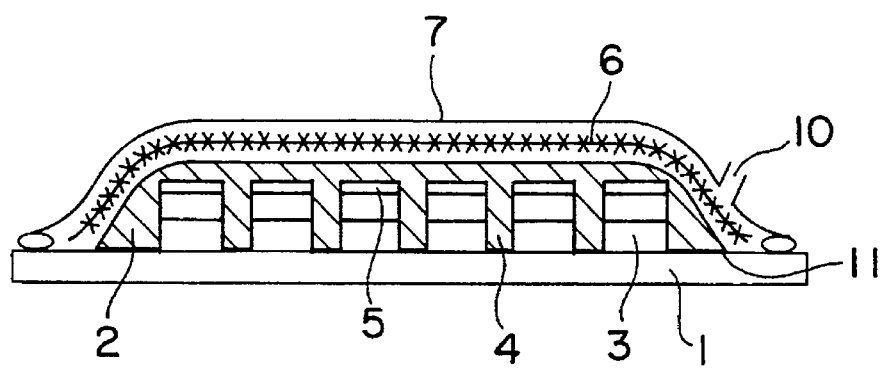
FIG. 2 is an illustrative drawing showing a status of a molding resin being applied and hardening by an autoclave being prepared according to a preferred embodiment of the present invention.

Then, as shown in FIG. 2, as a first step for preparation of hardening, the prepreg is covered by a resin membrane 11 and a half-hardened silicone rubber sheet as a molding resin 2 is put thereon, and then a breather 6 made of a woven stuff of glass fibers or nylon fibers is applied for the purpose of securing good vacuum exhaustion. As for a resin membrane 11, a fluororesin is suitable as it has a good break stretchability, tear strength and mold releasability. As for the thickness thereof, the thinner the better for good fitting to the holes and a thickness of 5 to 120 μ can be selected and utilized according to the diameters of the holes. In this embodiment, a resin membrane of 11 μ thickness is used for the holes 4 of a 2 mm diameter each.

A nylon bag film 7 is placed thereon, and sealing is achieved by sealant tapes so as to prevent air leakage between the forming jig 1 and the nylon bag film 7, and air is exhausted by use of vacuum from a vacuum exhaustion port 10. 60 minutes thereafter, a molding resin 2 is filled in the holes 4 of the prepreg 3, with a resin membrane 11 being applied inbetween, thus measures are taken to prevent the matrix resin of the prepreg 3 from flowing into the holes.

Figure 3:
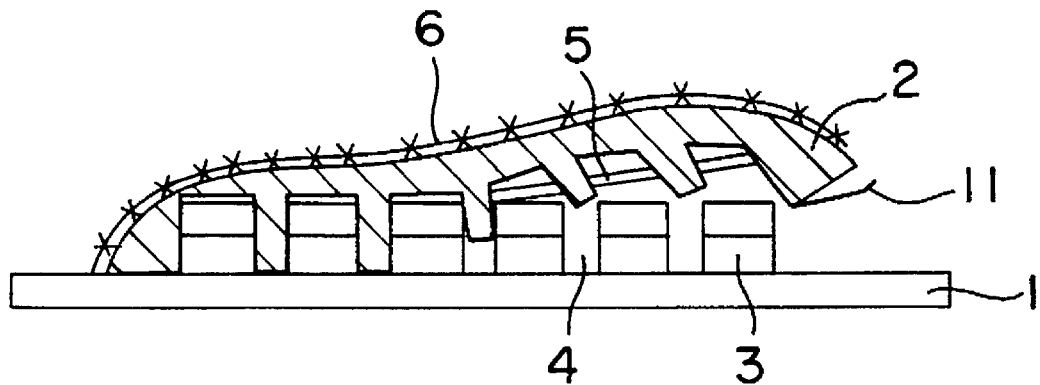
FIG. 3 is an illustrative drawing showing a process to remove the molding resin after hardening, according to a preferred embodiment of the present invention.
Figure 4:
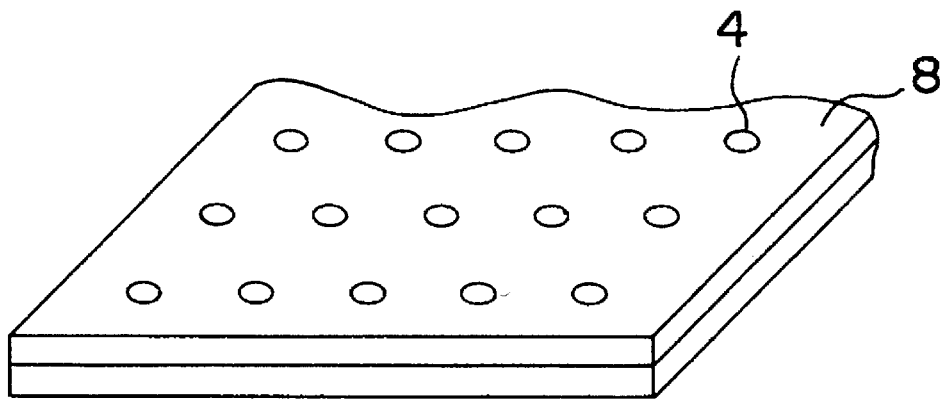
FIG. 4 is an illustrative drawing showing a multi-holed surface plate of a composite material after being formed according to a preferred embodiment of the present invention.

Then, the prepreg so prepared for forming is hardened in an autoclave. In this preferred embodiment, a pressure of about 3.5 kg/cm$^2$, heating is carried out at a temperature of 180° C. for about 2 hours. After completing the hardening, the temperature and pressure are lowered and a nylon bag film 7 is taken off. Then, the hardened molding resin 2 is removed as shown in FIG. 3. The hardened molding resin 2, which is bonded with a breather 6 by an adhesive, can be removed from the prepreg 3 together with the resin membrane 11 and the plastics film 5 without being torn. After this, the hardened prepreg 3 is taken up from the forming jig 1 and a multi-holed surface plate made of composite material 8 becomes complete, as shown in FIG. 4.

According to the manufacturing method according to the present invention, a multi-holed surface plate made of a composite material can be made without the holes of the prepreg being blocked by the flow of a resin while the prepreg is being hardened. Further, according to this manufacturing method, neither an expensive forming jig nor is the preparation of special jigs and tools necessary, whereby the manufacturing costs can be reduced.

Obviously many modifications and variations of the present invention are possible in the light of the above teachings. It is therefore to be understood that within the scope of the appended claims, the invention may be practiced otherwise than as specifically described.

What is claimed is:

1. A method of manufacturing a multi-holed surface plate from a composite prepreg material consisting of resins reinforced with fibers and having previously prepared holes therein, which comprises filling the previously prepared holes with a molding resin, said filling being carried out by interposing a flexible, mold releasable membrane between the prepreg and the molding resin to isolate the prepreg from the molding resin, hardening the molding resin and the resin in the prepreg by applying heat and pressure thereto and then removing the molding resin and mold releasable membrane therefrom to form the multi-holed surface plate.

2. The method of manufacturing a multi-holed surface plate made of a composite prepreg material according to claim 1, wherein the molding resin is a half-hardened silicone rubber.

3. The method of manufacturing a multi-holed surface plate made of a composite prepreg material according to claim 1, wherein the molding resin filled in the holes of the composite prepreg material is a silicone resin.

4. The method of manufacturing a multi-holed surface plate made of a composite prepreg material according to any one of claims 1, 2 or 3, wherein the molding resin filled in the holes of the composite prepreg material is covered by a breather made of a woven material.

* * * * *